United States Patent [19]
Elder et al.

[11] 4,218,587
[45] Aug. 19, 1980

[54] COMPLEX SIGNAL GENERATION AND TRANSMISSION

[75] Inventors: J. Mark Elder; Peter G. Ruether, both of Boulder, Colo.

[73] Assignee: Storage Technology Corporation, Louisville, Colo.

[21] Appl. No.: 943,159

[22] Filed: Sep. 18, 1978

[51] Int. Cl.² .............................................. H04J 3/12
[52] U.S. Cl. ................................. 370/81; 179/84 VF
[58] Field of Search ......... 179/15 AS, 15 BY, 84 VF, 179/18 FC, 15 BW; 340/347 DD

[56] References Cited

U.S. PATENT DOCUMENTS

| | | | |
|---|---|---|---|
| 3,980,874 | 9/1976 | Vora | 340/347 DD |
| 3,985,965 | 10/1976 | Field | 179/15 BY |
| 4,006,463 | 2/1977 | Hanks | 340/347 DD |
| 4,017,693 | 4/1977 | Roche | 179/84 VF |

*Primary Examiner*—David L. Stewart
*Attorney, Agent, or Firm*—Woodcock, Washburn, Kurtz, Mackiewicz & Norris

[57] ABSTRACT

Disclosed is an apparatus for and a method of complex signal generation and transmission having particular application in a time assigned speech interpolation or TASI system. Samples of the amplitudes of a plurality of signalling status and test signals are stored in a digital code in a digital memory. These samples are retrieved as needed without the need for a plurality of time base signal generating means. The signal to noise ratio of the signals to be transmitted is increased by statistically predicting the n equally likely amplitude ranges of the entire set of signals. Each character of the digital code employed identifies one of these ranges. The more likely occurring amplitudes are thus defined by more code characters than are the less likely amplitudes. Additionally, the signal to noise ratio of the entire set of signals is increased while minimizing the digital storage requirements of the system by the provision of a second digital memory for storing a single amplitude within each of the above-mentioned ranges. The samples stored in the first memory are used as index vectors which identify and select the single amplitudes stored in the second memory which are then transmitted to the receive side of a TASI system. Since the second memory is 2 x bits wide, while the index vectors are stored in a memory only X bits wide, digital storage requirements are minimized.

18 Claims, 17 Drawing Figures

GRP. 3

Fig. 7A

|  | | 1984 | 2104 | 2224 | 2344 |
|---|---|---|---|---|---|
| 896 | 1165 | 0 | 1 | 2 | 3 |
| GRP. 2 | 1272 | 4 | 5 | 6 | 7 |
| | 1406 | 8 | 9 | 10 | 11 |
| | 1555 | 12 | 13 | 14 | 15 |

50

GRP. 3

|  |  | | 1984 | 2104 | 2224 | 2344 |
|---|---|---|---|---|---|---|
| GROUP 1 | 813 | 1165 | 16 | 17 | 18 | 19 |
| | GRP. 2 | 1272 | 20 | 21 | 22 | 23 |
| | | 1406 | 24 | 25 | 26 | 27 |
| | | 1555 | 28 | 29 | 30 | 31 |

52

GRP. 3

|  | | 1984 | 2104 | 2224 | 2344 |
|---|---|---|---|---|---|
| 733 | 1165 | 32 | 33 | 34 | 35 |
| GRP. 2 | 1272 | 36 | 37 | 38 | 39 |
| | 1406 | 40 | | | |
| | | | | | |

54

STATUS & TEST SYMBOLS

| SYM # | SYMBOL DEFINITION |
|---|---|
| 41 | 3db TWIST in 733Hz COMPONENT |
| 42 | 3db TWIST in 1406Hz COMPONENT |
| 43 | 3db TWIST in 2344Hz COMPONENT |
| 44 | 2031.25 Hz ECHO SUPPRESSOR DISABLE TONE 2025 Hz, (65 CYCLES/32msec) |
| 45 | 312.50 Hz LOW ALIGNMENT TONE (10 CYCLES / 32 msec) |
| 46 | 3000.00 Hz HIGH ALIGNMENT TONE (96 CYCLES / 32 msec) |
| 47 | 1031.25 Hz SIGNALLING PRESENT & AGC TONE (33 CYCLES/32 msec) |

COMPLEX SIGNAL GENERATION AND TRANSMISSION

BACKGROUND OF THE INVENTION

This invention relates in general to an apparatus for and a method of generating and transmitting an ensemble of complex waveforms and in particular it relates to an apparatus for generating and for transmitting complex waveforms used as control signals in a time assigned speech interpolation system.

A time assigned speech interpolation or TASI system is a high speed switching and transmission system which uses the idle time (i.e., silence) in telephone calls to interpolate the speech of as many as N talkers onto approximately N/2 facilities. One such system is disclosed in the co-pending application to William A. Morgan, Ser. No. 863,902, filed Dec. 23, 1977 and assigned to the assignee of the present invention. In the TASI system disclosed therein, calls from N callers are transmitted across, for example, N/2 facility channels. Calls into the transmit side of the system are monitored by a plurality of speech detectors. When a talk burst is detected on a particular input channel by a speech detector, the talk burst is converted to digital form and that digital talk burst is briefly delayed. If a facility is available for transmission of the talk burst to the receive side of the system, the talk burst is delayed for a fixed period of time until a short control message or signalling system may be transmitted prior to the talk burst. This control message or signalling symbol is necessary so that the incoming talk burst on the receive side of the system may be identified as to its origin and directed to the proper output channel by switching means located there.

It is essential that the origin of each talk burst be unambiguously identified at the receive side of the system in order that the proper talker and listener may be interconnected. It is critical that the control signal be difficult to duplicate accidentally and, therefore, that the signal to noise ratio of each signalling symbol be as high as practical. If control signals could be accidentally duplicated, either by noise or by a speaker's voice signal, if would be possible for certain frequencies in a talker's speech train to masquerade as control signals. In this event, the talker's speech train would be momentarily directed to an improper listening party.

One arrangement for providing control signals which minimizes the likelihood of a spurious signal being confused for a control signal is provided in the present invention by a means for generating complex control signals which are the sum of, for example, four separate frequencies since a complex waveform comprised of the sum of a plurality of frequencies is not easily simulated by spurious signals.

However, in a TASI system having a relatively large number of inputs and outputs, a relatively large number of control signals are required. For example, in the aforementioned TASI system as many as 48 separate control signals may be required. If each control signal is comprised of the sum of three information bearing frequencies and one fixed frequency for timing control, then this requires that twelve separate frequencies be available for summation, in order that the 48 distinct four tone sums may be produced. It would be desirable to generate these 48 distinct symbols without the need for a large plurality of separate precise time base signal generating means.

In addition to the provision of signalling symbols in the aforementioned TASI system, signals must be transmitted between the near and far ends of the system to convey dialing information and other call status information. Such messages are composed of a series of symbols taken from the same set of twelve separate frequencies. A further need is for test signals for facility line-up and control of the gain of the far end facility interface circuit. These status and test signals are advantageously sinusoids, rather than the sums of sinusoids used for signalling symbols. It would be desirable to generate these status and test signals without need for additional time base signal generating means.

Further, since all of the aforementioned signalling, status and test signals are used on a repetitive basis, they are preferably stored in a digital memory to be recalled as needed. One method to insure high signal to noise ratio of the transmitted signalling status and test symbols would be to store the amplitudes of the signals in a digital memory with a large number of significant bits. However, since large digital memories are expensive, efforts have been made to reduce the memory capacity required in many systems. For example, it is an object of U.S. Pat. No. 3,684,680 to Amano et al to keep the memory capacity of a TASI system at a minimum.

However, in accordance with the present invention, the signal to noise ratio of complex waveforms to be transmitted is increased by statistically predicting the n equally likely amplitude ranges of the entire set of signalling symbols. Samples of the signalling symbols are stored in a digital memory in a digital code, each of the characters of which defines one of these ranges. Since there are more code values for the more likely amplitudes, these are transmitted with a higher accuracy than samples found in those having less likely amplitudes.

The prior art Bell system model $\mu255$ logarithmic code converter is an analog to digital converter, which when converting analog voice signals to digital form, uses a procedure whereby a digital code is used to represent analog signals and the code values are a nonlinear function of the amplitude of the analog voice signal. In fact, in the Bell device the digital samples which are transmitted represent approximately the log of the amplitude of the sampled analog signal. In this manner, the digital samples taken of low amplitude analog signals are more accurately transmitted with respect to the actual amplitude of those signals than are samples taken of higher amplitude signals. Therefore, the percentage error of each sample is relatively constant over the entire range of analog signal amplitudes. However, one problem associated with the Bell system device is that it does not maximize the signal to noise ratio in all cases. For example, since the Bell device transmits low amplitude signals more accurately than high amplitude signals, if persons using the system consistently speak at high volume and thus at high amplitude, the signal to noise ratio of their speech signals is not maximized. It would be desirable in a TASI system to maximize the signal to noise ratio of the fixed set of signalling symbols to be employed therein.

Accordingly, it is an object of the present invention to provide an apparatus for generating a plurality of separate single frequency and multifrequency symbols which does not require a large plurality of process signal generating means.

It is a further object of the present invention to provide a means for generating a complex waveform comprising the sum of a plurality of separate frequencies.

It is a still further object of the present invention to provide an apparatus for and a method of transmitting a complex waveform which insures that the waveform may be unambiguously received.

It is a still further object of the present invention to provide an apparatus for generating a plurality of complex waveforms having a high signal to noise ratio.

It is a still further object of the present invention to provide an apparatus for generating a plurality of signalling symbols having a relatively high signal to noise ratio yet with relatively small digital storage requirements.

It is a still further object of the present invention to provide an apparatus which can generate a plurality of multi-frequency signalling symbols or test frequencies on up to 16 facilities simultaneously and independently.

SUMMARY OF THE INVENTION

These and other objects of the present invention are achieved by an apparatus which stores in a first digital memory a plurality of amplitude samples of single frequency and multi-frequency signalling, status and test signals. The complete set of required samples may be retrieved from the memory as needed without the need for a plurality of time base signal generating means. Additionally, the signal to noise ratio of the required signals is increased by storing samples in a digital code which defines the n statistically predicted equally likely amplitude ranges of the entire set of signals. Thus, the more likely amplitudes are defined by more code characters than are the less likely amplitudes. Additionally, the signal to noise ratio of the entire set of signalling symbols is increased while minimizing digital storage requirements of the system by employing a second digital memory for storing a single amplitude within each of the aforementioned ranges. The code characters in the first memory are used as index vectors which identify and select a single amplitude in the second memory which is to be retrieved and transmitted.

BRIEF DESCRIPTION OF THE DRAWINGS

The present invention will be more fully described by reference to the accompanying drawings in which:

FIGS. 3a and 3b are a schematic representation of the frequency components used to form the signalling, status and test signals in accordance with the present invention;

DETAILED DESCRIPTION OF A PROPOSED EMBODIMENT

Figure 1:
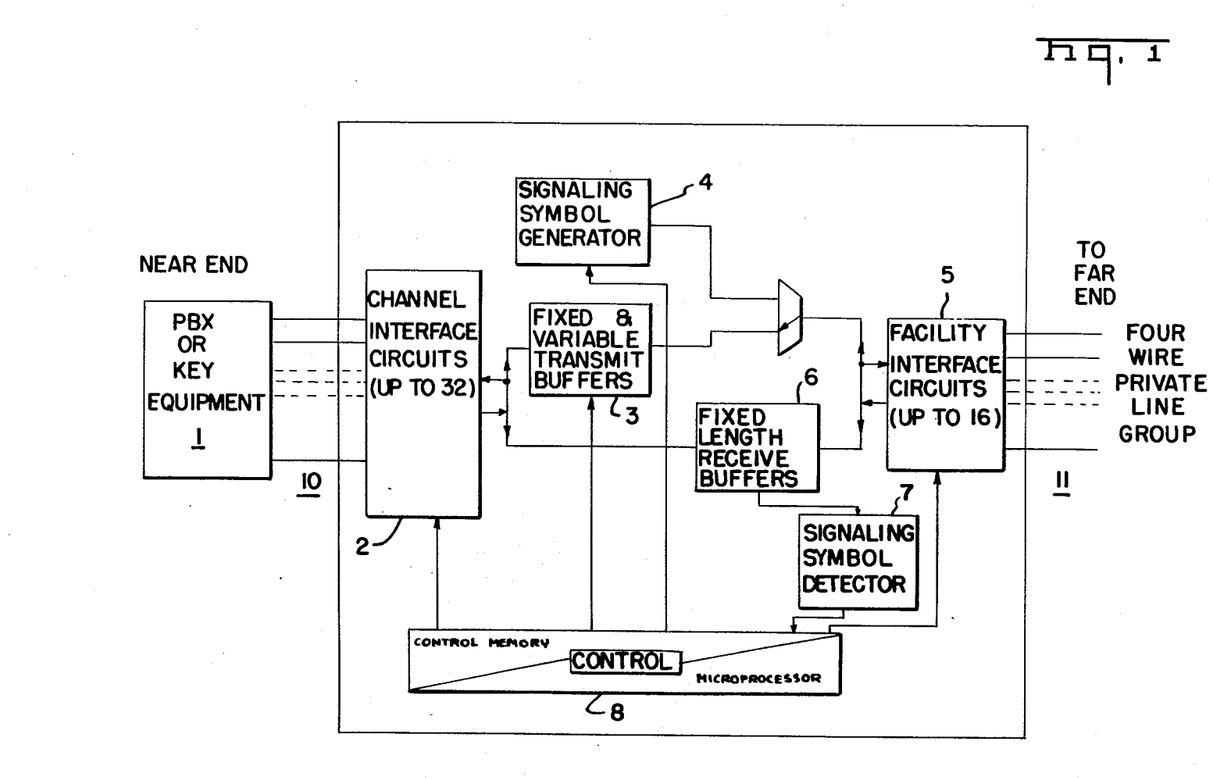
FIG. 1 shows the overall system to which the present invention is applied.

FIG. 1 is a block diagram of the overall system to which the present invention is applicable. Subscriber equipment 1, such as PBX or key equipment, is serviced by a private line communication system which includes four-wire transmission facilities 11. The subscriber equipment is connected over input channels 10 to the system described in the aforementioned Morgan application. The N input channels will normally be serviced by approximately N/2 transmission facilities. Typically, up to 31 input channels will be serviced by up to 16 transmission facilities.

Channel interface circuits 2 include analog-to-digital converters and a switching network for periodically polling each of the input channels to serve them in sequence. Fixed and variable transmit buffers 3 are provided. In accordance with the Morgan invention, the variable buffers provide temporary storage for the sampled signals if a facility is unavailable. A signalling symbol generator 4 generates a tone symbol which is inserted before each speech burst transmitted on a facility to indicate the channel which originated that speech burst. Fixed buffer 3 provides a time interval in which to transmit the symbol without clipping the input signal.

Speech bursts are connected through interface circuits 5 to the transmission facilities 11. Interface circuits 5 include a switching network and digital-to-analog converters.

The transmission facility transmits these anlog signals to a remote location sometimes referred to as the "far end".

When messages are received from the remote location, the fixed length receive buffers 6 provide a time interval in which the symbol detector 7 decodes the signalling symbol to determine to which channel the message should be assigned. The assignment of channels to facilities and the time that a message may be stored in the variable speech buffer is under control of control means 8, typically a microprocessor.

Figure 2:
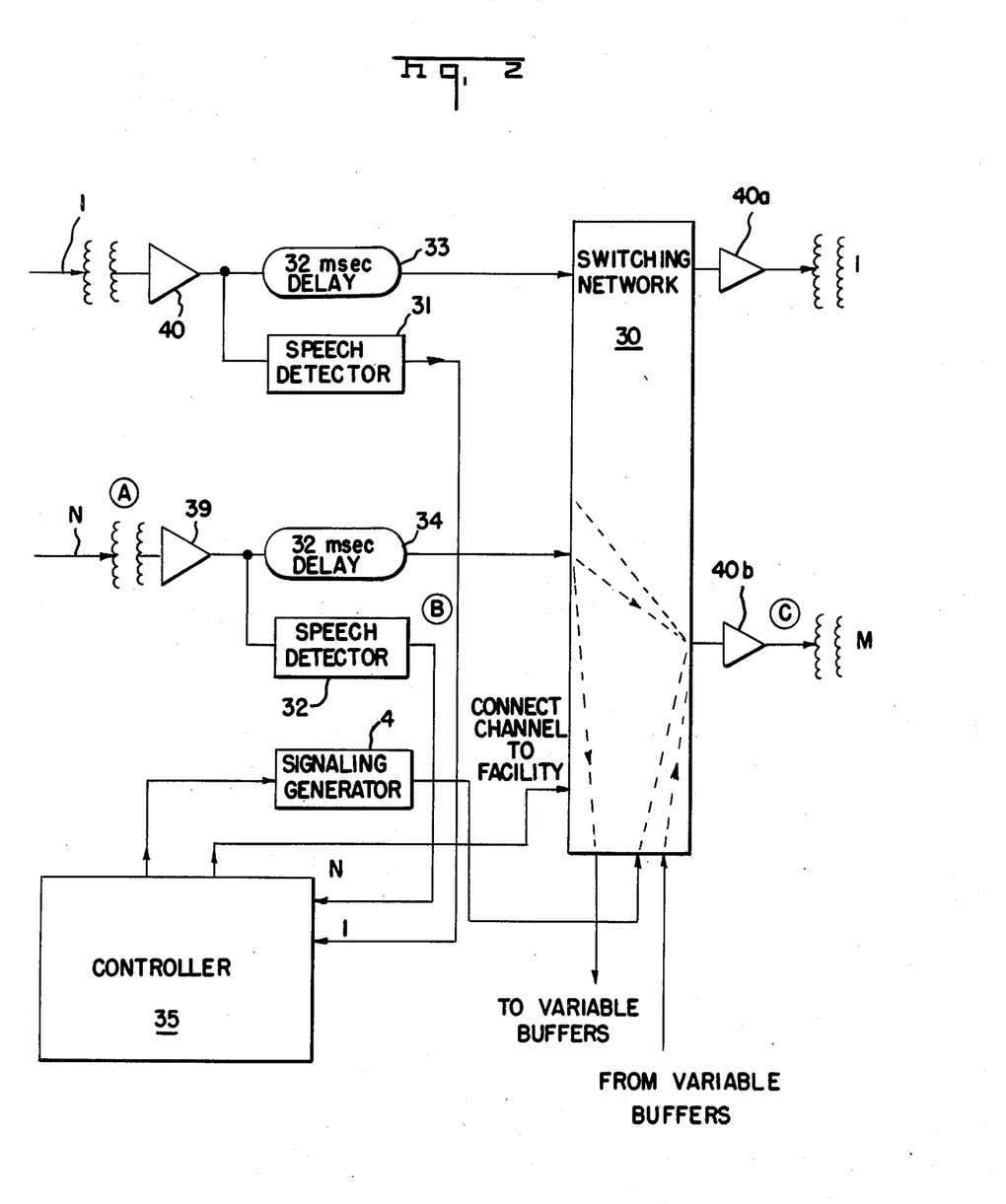
FIG. 2 shows a block diagram of the sending side of that system.

Referring to FIG. 2, there are N input speech channels of which only channel 1 and channel N have been shown. As is conventional in such systems, signals from the input speech channel are applied to switching network 30 which selectively connects an input speech channel to an available transmission facility 1...M. Only transmission facilities 1 and M have been shown. Typically, there are approximately half as many transmission facilities as there are input speech channels. Speech detectors 31, 32 and others, detect the presence of a signal on an input channel. In response to the detection of a signal on the input channel, a controller 35 operates switching network 30 to connect the input speech channel to an available transmission facility. FIG. 2 shows input speech channel N connected to transmission facility M.

In accordance with the invention described in copending application Ser. No. 863,890 filed Dec. 23, 1977 by T. B. Cannon and J. F. O'Neill and assigned to the assignee of the present invention fixed delays 33, 34 and others are connected between each input speech channel and switching network 30. The delays 33 and 34 provide a time interval during which a control message or signalling symbol from signalling symbol generator 4 is applied to the transmission facility. This symbol from signalling generator 4 identifies the speech channel to which the transmission facility has been assigned. For example, assume transmission facility M has been assigned to input speech channel N as shown in FIG. 2. Signalling generator 4 generates a symbol representing input channel N. This is applied to the transmission facility M before the speech signal, sometimes referred to as a speech burst. The fixed delay 34 which preferably is on the order of 32 msec, provides the time interval required to insert the symbol before the speech signal.

Features which are shown on FIG. 2 which are not part of the present invention include capability for converting signals from the input channels into digital (P.C.M.) form by means of the analog-to-digital converters 39 and 40. These digital signals may be stored for variable times in digital buffers (not shown), and then transmitted on a facility when a facility becomes available. This is described in the aforementioned application of William A. Morgan. The digital signals are converted back to analog by converters 40a and 40b before the signals as applied to the transmission facilities.

The operation of the sending system shown in FIG. 2 is as follows: Speech detectors 31 and 32 monitor the input speech channels and apply signals to controller 35 indicating when a speech burst appears on a particular input channel. The controller 35 controls the connection of an active speech channel to an available transmission facility. Assume a speech burst appears on input speech channel N and that this channel has not previously been connected to a transmission facility. The controller 35 determines that transmission facility M is available. It generates a signal which will later connect the output of fixed delay 34 to transmission facility M, and it connects the output of signalling generator 4 to transmission facility M. During the pause in the speech pattern, the controller operates switching network 30 to connect the output of the signalling generator 4 to the facility M.

The manner in which controller 35 determines the availability of the transmission facility and which facility is to be disconnected and reconnected to a new speech channel can be in accordance with the prior art. Controller 35 can be implemented with an 8085 type microprocessor by INTEL Corporation.

Signalling generator 4 generates a signalling symbol identifying channel N. This is transmitted over transmission facility M. After the occurrence of this signalling symbol, the speech burst occurs at the output of the fixed delay 34. This is applied to transmission facility M and transmitted to the remote location.

Figure 2A:
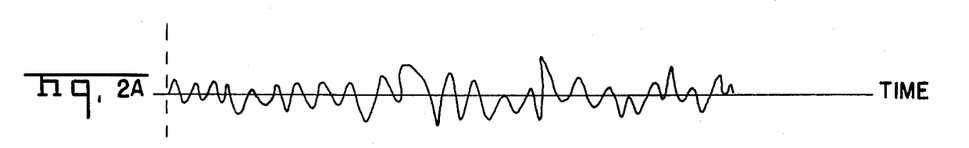
FIGS. 2a through 2c show waveforms at points A, B and C of FIG. 2.
Figure 2B:
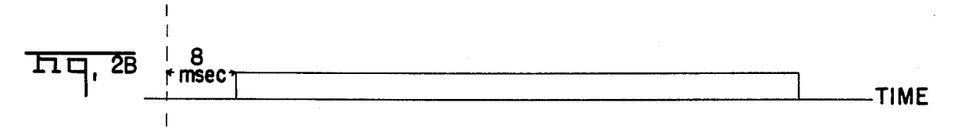
Figure 2C:
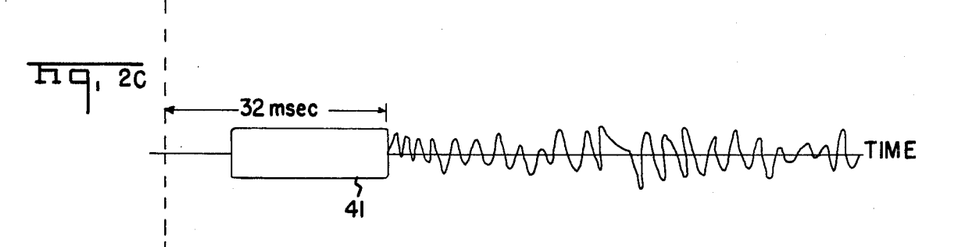

The operation of the system of FIG. 2 is summarized in FIGS. 2A-2C which respectively show the waveforms at the points A, B and C in FIG. 2. A speech burst occurring on channel N is shown in FIG. 2A. The burst is detected by speech detector 32 which requires approximately 8 milliseconds to respond. The response of speech detector 32 is shown in FIG. 2B. This response is applied to the controller 35 which enables signalling symbol generator 4 to generate the signalling symbol 41 (FIG. 2C) which includes the sum of four separate frequencies.

Three frequencies identify channel N as the speech channel to which the transmission facility has been assigned. The fourth frequency is a switching timing control frequency. This fourth frequency is always the same frequency, 1031.25 Hz in this example, and it is used to switch at precise times at the remote location. This signalling symbol appears on the transmission facility M. At the end of the 32 milliseconds delay, the signalling symbol terminates. At this time, the beginning of the speech burst appears at the outset of the 32 msec delay 34. The speech burst together with the preceding signalling symbol is transmitted to the remote location.

Figure 3A:
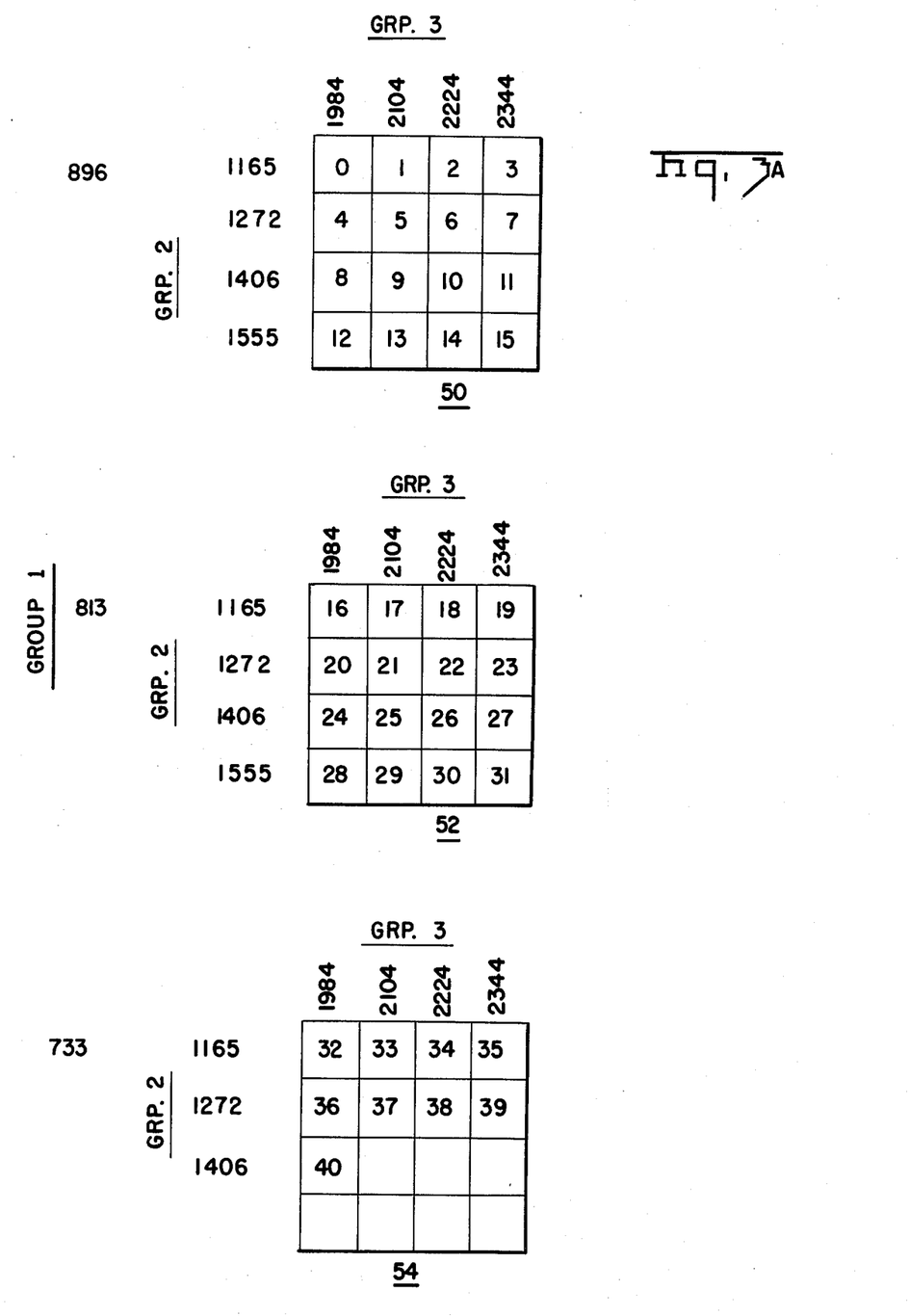

Referring now to FIGS. 3A and 3B, the signalling symbols employed and those used as the aforementioned status and test signal will be more fully described.

As mentioned above, the signalling symbols of the present invention are comprised of the sum of four separate frequencies, one of which is a constant frequency of 1031.25 Hz. The remaining three of the four frequencies are selected from groups of frequencies shown in FIG. 3A. FIG. 3A shows three groups of frequencies. Group 1 is comprised of frequencies of 896, 813, and 733 Hz. Group 2 is comprised of frequencies of 1,165, 1,272, 1,406 and 1,555 Hz. Group 3 is comprised of frequencies of 1,984, 2,104, 2,224 and 2,344 Hz. The frequencies in each of these groups are shown schematically as being arranged adjacent to the rows and columns of matrices 50, 52 and 54. The numbers 0 through 40 found in these matrices represent the various possible input channels and other messages of the TASI system with which the present invention is employed. The frequencies which are adjacent to the row and column of a particular location in each of these matrices 50, 52 and 54 indicate three of the frequencies which are summed to provide a signalling symbol used to identify that particular input channel. Thus, for example, the signalling symbol which identifies input channel 3 is comprised of the sum of the frequencies $f_1$, $f_2$ and $f_3$ found at the row and column of that channel, i.e., 896, 1,165 and 2,344 Hz. To these frequencies a fixed frequency $f_4$ of 1031.25 Hz is added to completely identify input channel 3.

Also, shown in FIG. 3B, is a list of a plurality of frequencies numbered 41–47 which are status and test symbols. Frequencies 44–47 are single rather than multiple frequency tones.

Figures 4A, 4B:
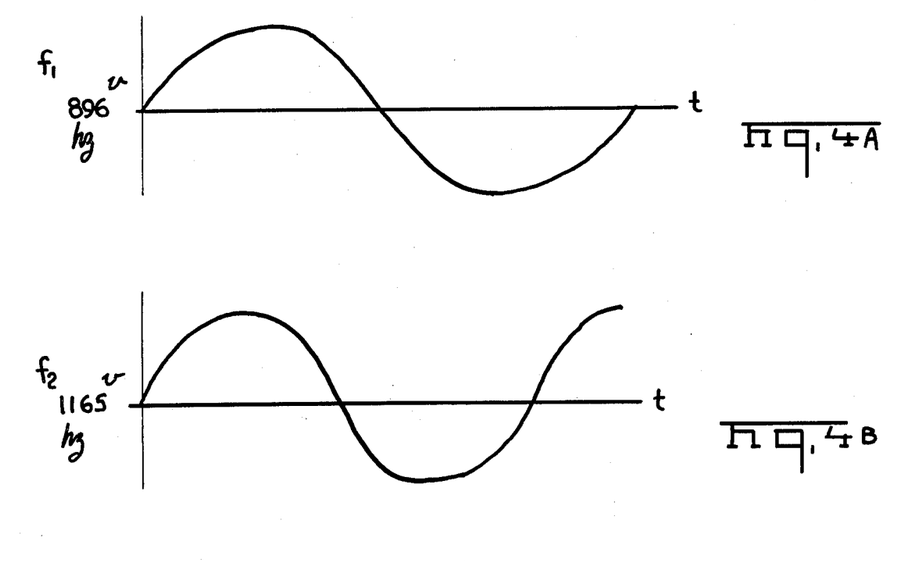
FIGS. 4a through 4d are waveform diagrams of the frequency components of a particular signalling symbol.
Figure 4C:
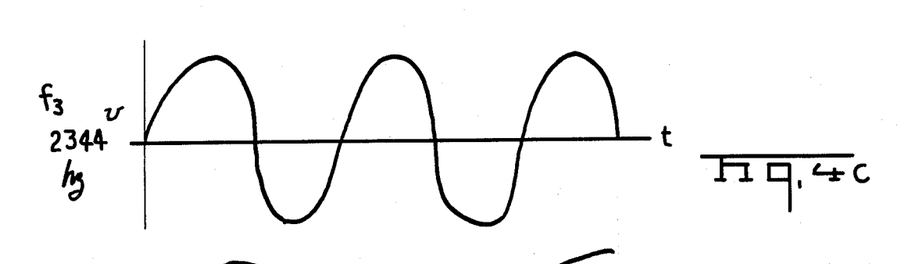
Figure 4D:
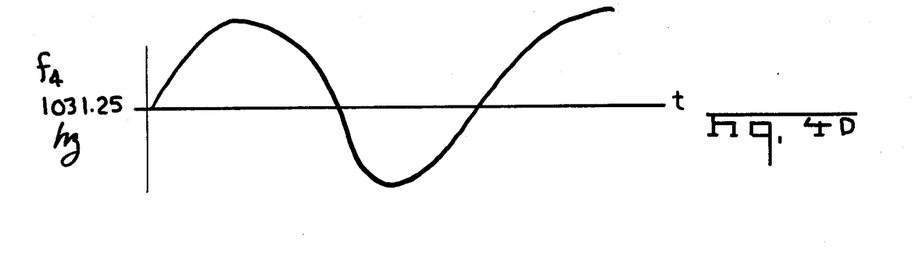
Figure 4E:
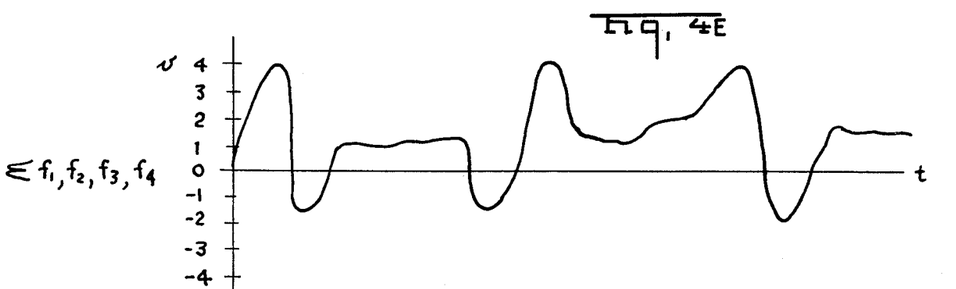
FIG. 4e is a waveform diagram of the sum of those components.
Figure 4F:
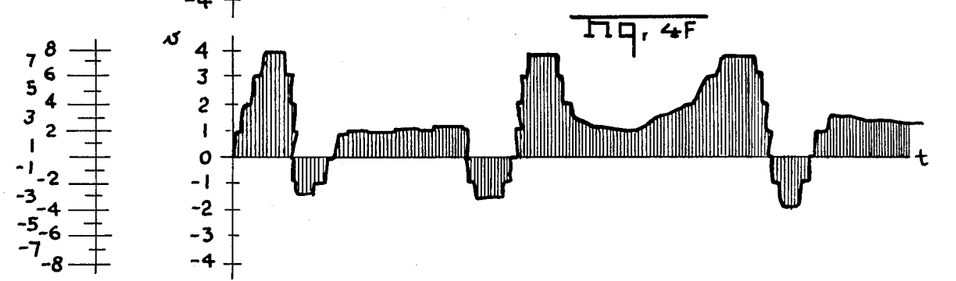
FIG. 4f is a waveform diagram of a plurality of digital samples taken of that sum.
Figure 4G:
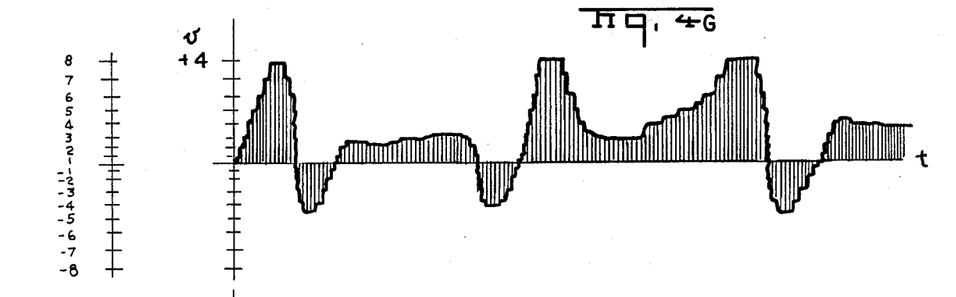
FIGS. 4g and 4h are a waveform diagram of a plurality of digital samples taken of that sum which are coded according to the prior art in FIGS. 4g and according to the present invention in FIG. 4h.

Referring now to FIG. 4, FIGS. 4A–4E show the waveform used to identify input channel 3 as an example. Specifically, FIGS. 4A–4D show the various components $f_1$, $f_2$, $f_3$ and $f_4$ of the signalling symbol identifying input channel 3. FIG. 4E represents the composite signalling symbol which is the sum of the waveforms shown in FIGS. 4A–4D. One method of generating the signalling symbol shown in FIG. 4E would be to provide four separate time base generating means, each producing one of the waveforms shown in FIGS. 4A–4D and then to sum these component waveforms. However, in accordance with the present invention, digital samples of the amplitude of the waveform shown in FIG. 4E are taken. The samples of the waveform shown in FIG. 4E may be seen in FIG. 4F (not drawn to scale). In the preferred embodiment, the sampling rate is 8 KHz. and therefore one sample is taken every 125 microseconds. Since each signalling symbol is 24 milliseconds long, 192

$$\left( \frac{125 \text{ samples/microseconds}}{24 \text{ milliseconds}} \right) \text{ samples define each symbol.}$$

Each single frequency tone is chosen so that a 32 ms interval contains an integral number of periods of the sinusoid. Thus a continuous tone, without phase discontinuities, may be constructed by concatenating these 32 ms segments indefinitely.

Figure 6:
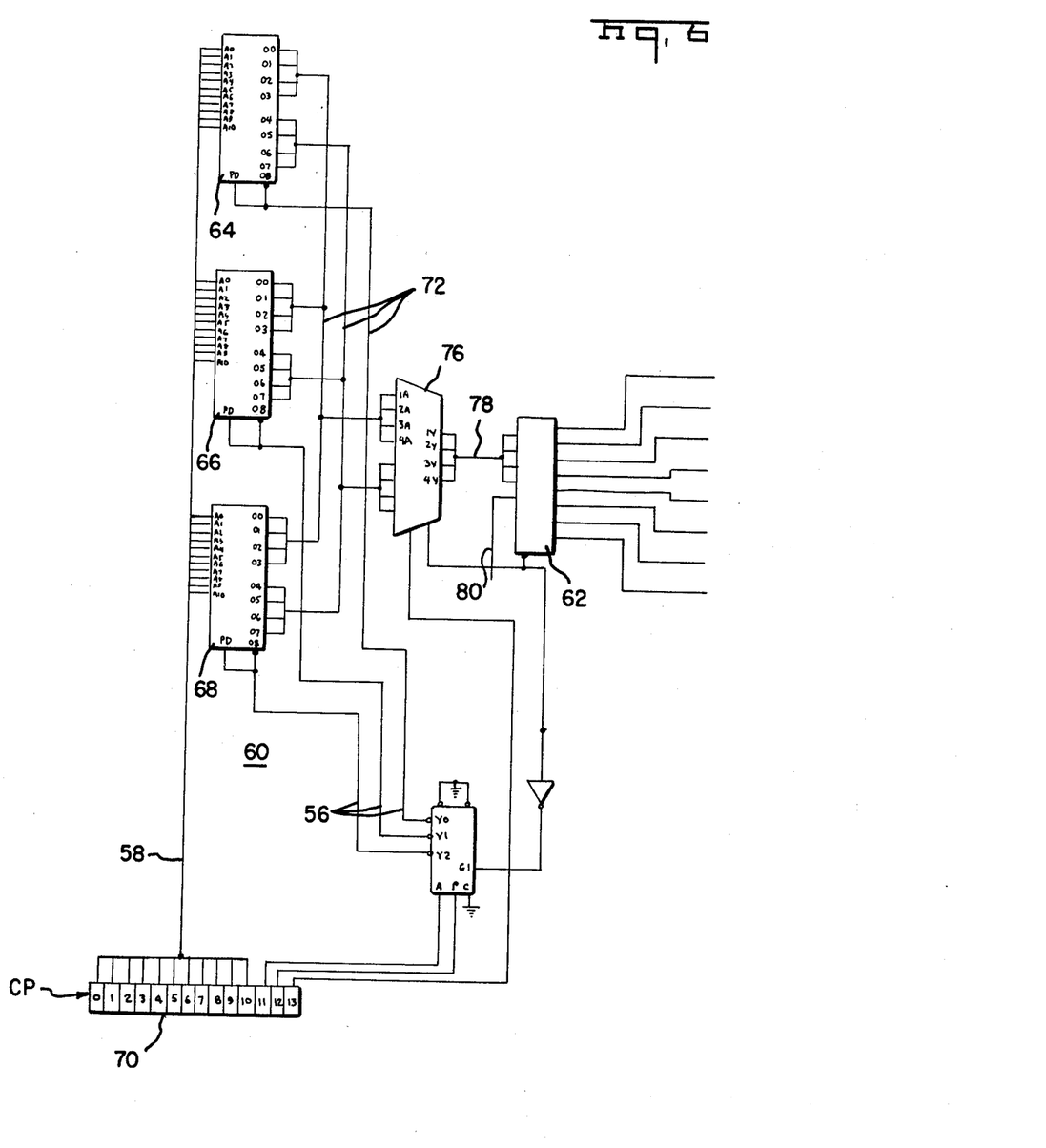
FIG. 6 is a block diagram of the symbolling signal generator shown in FIG. 2.
Figure 7B:
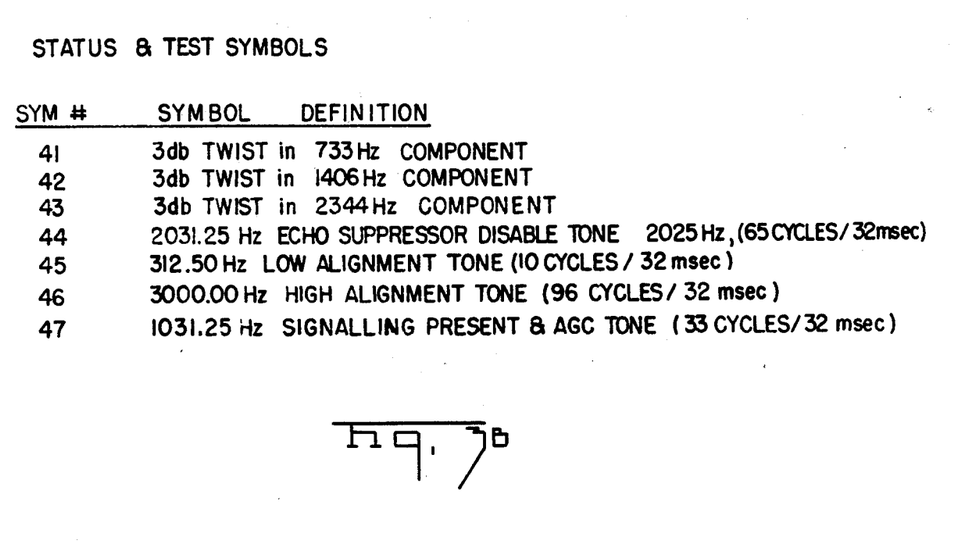

These 192 samples of each of the multifrequency symbols and 256 samples of each single frequency tone shown in FIG. 3 are stored in a first digital memory 60 (FIG. 6). Only a single clock means need be used to retrieve these samples from the memory 60 when required These digital samples may be stored in the first digital memory until needed in a code having n unique outputs. Such a code may be achieved by storing the samples in an array x bits wide where $2^x = n$. In the preferred embodiment $x = 4$ and $n = 6$. However, it is desirable that the signal to noise ratio of the samples to be transmitted to the receive side of the system be as high as practical. One procedure for increasing the signal to noise ratio of the stored samples would be to increase the number of code characters employed, i.e., to store the samples in arrays wider than 4 bits. For example, an array of 8 bits rather than 4 bits wide has $2^8$ or 256 unique outputs and thus storage in an 8 bit array would greatly increase the signal to noise ratio. However, as mentioned above, it is desirable to keep the digital storage requirement to a minimum.

Accordingly, the present invention employs a novel arrangement to maximize the signal to noise ratio while minimizing digital storage requirements.

In the preferred embodiment of the present invention, storage requirements are minimized in that the memory employed does not exceed 4 bits in width and thus the code used to define the samples of all signalling symbols will contain only $2^4$ or 16 characters. One approach for storing the samples shown in FIG. 4F might be to employ the 16 character code shown on the linear scale to the left of FIG. 4F. Using that scale, each of the 16 digital code characters from $-8$ to $+8$ represents a constant voltage range of 0.5. In other words, the voltage scale is divided into equal ranges and each range is represented by one digital code character. However, such an approach, while minimizing storage requirements, does not maximize signal to noise ratio.

Another alternative for maintaining a 16 character code and which also increases the signal to noise ratio of the transmitted signal would be to employ the method used in the aforementioned Bell device. In the Bell device rather than have each of the elements of the digital code employed represent equal voltage ranges, the code approximately represents the logarithm of the voltage as shown on the log scale to the left of FIG. 6G. However, as mentioned above, if the code used represents voltage ranges the width of which vary logarithmically, low amplitude signals will be transmitted more accurately than high amplitude signals. This result would not necessarily be optimum for the signalling, status and test signals to be employed.

Therefore, in the preferred embodiment of the present invention to maximize signal to noise ratio, the n equally likely amplitude ranges of the entire set of samples of signalling symbols are predicted statistically and each of the n unique outputs of the digital code used identifies a particular one of these ranges. Accordingly, the most likely occurring amplitudes are defined by more code characters than are the less likely occurring amplitudes.

Figure 5:
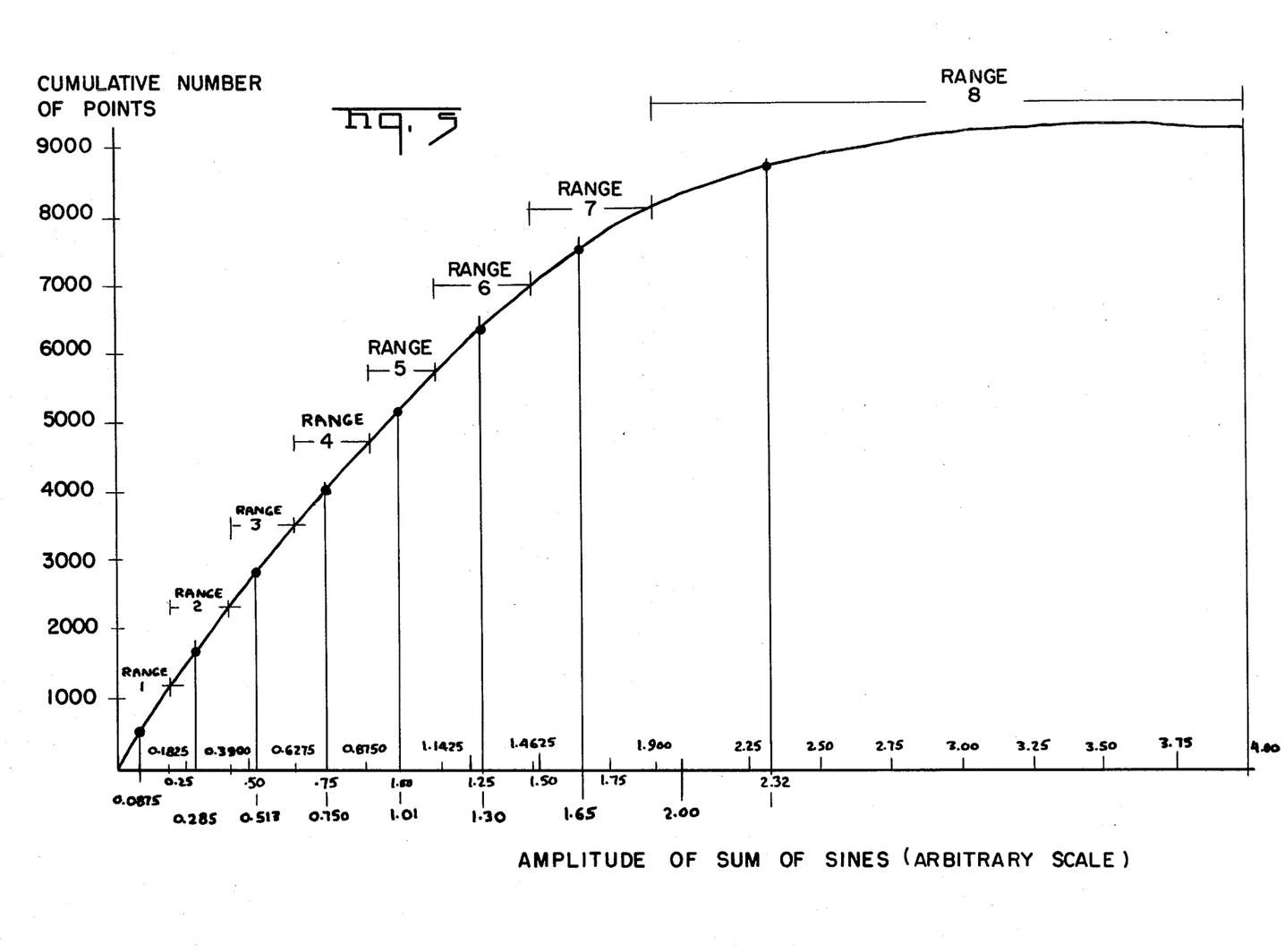
FIG. 5 is a diagram of the amplitude histogram of the entire set of signalling symbols used in accordance with the present invention.

The particular method by which the n most likely amplitude ranges are statistically predicted may be seen with reference to FIG. 5.

FIG. 5 is a histogram or frequency of occurrence plot of all of the required multifrequency waveforms used with the present invention. An additional histogram (not shown) of the single frequency test and status symbols is also provided. To generate the plot shown in FIG. 5, samples of all of the required multifrequency waveforms are taken and the number of times each amplitude is observed is counted. The amplitudes are then rank ordered from lowest to highest and the number of samples having an amplitude between the lowest amplitude observed and the highest observed in each successive rank are plotted on the y axis while the amplitudes are plotted on the x axis. In the preparation of FIG. 5, 18,432 samples were observed and of these samples half (9,216) had amplitudes of between 0 and $+4$. These are plotted in FIG. 5. Half of the samples observed had amplitudes between 0 and $-4$ and they have not been plotted for the sake of simplicity since the plot is symmetric about the y axis for practical purposes.

Tht total number of samples taken are then grouped into n batches. Since n has been chosen to be 16 there are $(18,432/16) = 1,152$ samples per batch. From the Figure, the n equally likely amplitude ranges may then be determined by determining the lowest and highest amplitudes observed in each batch. Thus, the first amplitude range is that between 0 and the x value corresponding to $y = 1,152$. This value is 0.1825. The next amplitude range is that between 0.1825 and the x value corresponding to $y = 2(1,152)$ or 2,304. This x value is 0.39. Each of these ranges thus contains 1,152 samples. Using this procedure, the n equally likely amplitude ranges may be calculated. Thus, each of the 16 unique code outputs of the first digital memory identify one of those ranges denoted 1 through 8 in FIG. 5 or $-1$ through $-8$ (not shown). Since the width of each range, for example range No. 1, is less than the width of the succeeding ranges, for example range 2 or 3, the digital code of the first digital memory which is used to identify each waveform is more accurate for the more likely amplitudes than for the less likely amplitudes and thus the signal to noise ratio of the transmitted waveforms is increased.

Figure 4H:
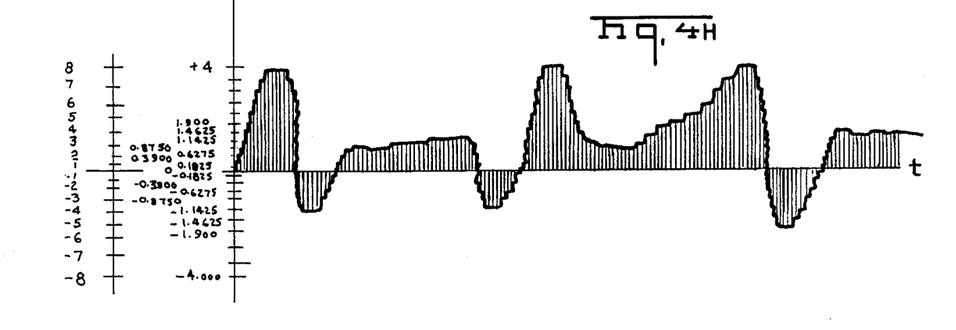

Referring back to FIG. 4H, a digital code which defines the n equally likely predicted amplitude ranges is shown. Each unit of the 16 character code shown on the left scale of FIG. 4H represents a voltage range the width of which has been predicted in FIG. 5.

Moreover, in accordance with the present invention, the signal to noise ratio for amplitudes in each of these ranges may be maximized without increasing the digital storage requirements of the system by transmitting a single point or amplitude within each of these ranges. The single point selected is the statistically weighted midpoint of each range along the curve shown in FIG. 5. These midpoints are stored in a second digital memory 62. Whenever a sample is retrieved from the first digital memory which lies within one of the n ranges defined above, the midpoint of that range will be transmitted. Thus the samples stored in the first digital memory 60 are index vectors which identify particular midpoints to be transmitted.

FIG. 6 shows the signalling symbol generator according to this invention which is comprised of the aforementioned first digital memory 60 and second digital memory 62. The memory 60 is preferably comprised of a plurality of separate programmable read only memories or PROMS, shown at 64, 66 and 68. These PROMS for example, comprise devices such as Model 2716 manufactured by Intel Corporation. Each of the PROMS 64, 66 and 68 may, for example, be effectively 2,000 words long by 8 bits wide. However, in the embodiment shown in FIG. 6, each of the PROMS are divided into two 4 bit columns and 48 signalling symbols are stored there.

The controller 35 (FIG. 2) comprises a clock means therein which produces clock pulses having a frequency of 8K cycles per seconds. These clock pulses are applied to a counter shown at 70. Bits 11–13 of the counter 70 determine which of the PROMS 64–68 is being selected via lead lines 56 and which column is being polled. Bits 0–10 are connected to PROMS 64–68 by lead line 58 and these bits select a particular array from the selected PROM and the selected column. Each of the samples or index vectors which are read out of the PROMS 64–68 comprise a data stream of 192 words, each of which is four bits wide.

It should be noted that by generating these index vectors in one of the PROMS 64–68 rather than by using a plurality of separate analog tone generators, only a single time-base frequency, namely the frequency of the aforementioned clock pulses need be provided. Since only one time-base frequency rather than a plurality is required, the probability that the frequency of the time-base generator might vary is minimized. Therefore, the chance that the proper input channel will be accurately identified is enhanced.

The signal to noise ratio of the transmitted signals is maximized by applying the stream through lead lines 72 to a gate means 76 and from there through a lead line 78 to the second digital memory 62 which is comprised of a programmable read-only memory having a memory portion and a logic portion.

Stored in the second digital memory 62 are the aforementioned midpoints of the n predicted ranges. In the preferred embodiment, these midpoints are stored in second digital memory 62 in an array which is eight bits wide. Each index vector retrieved from the digital memory 60 thus identifies through the logic portion of the memory 62 a particular midpoint to be transmitted. Since the midpoint is transmitted in an eight bit code while the samples or index vectors are stored in the first memory 60 in a four bit code, the signal to noise ratio is maintained with only a small increase in digital storage requirements.

An example of one method by which a particular midpoint is stored, selected and transmitted is set forth as follows.

Suppose, a sample is to be transmitted having an amplitude of 1.75. From the histogram of FIG. 5, it may be seen that this value is found in the seventh voltage range. Accordingly this sample is stored in the first digital memory in a 4-bit binary code, as code number +7, the binary value of which may be determined from the following table:

TABLE I

| Voltage Range (volts) | Midpoint | Code No. | 4-bit Binary Code |
|---|---|---|---|
| 1.900 to 4.000 | 2.320 | +8 | 1111 |
| 1.4625 to 1.9000 | 1.650 | +7 | 1110 |
| 1.1425 to 1.4625 | 1.300 | +6 | 1101 |
| 0.8750 to 1.1425 | 1.010 | +5 | 1100 |
| 0.6725 to 0.8750 | 0.750 | +4 | 1011 |
| 0.3900 to 0.6275 | 0.513 | +3 | 1010 |
| 0.1825 to 0.3900 | 0.285 | +2 | 1001 |

TABLE I-continued

| Voltage Range (volts) | Midpoint | Code No. | 4-bit Binary Code |
|---|---|---|---|
| 0 to 0.1825 | 0.0375 | +1 | 1000 |
| −0.1825 to 0 | −0.0375 | −1 | 0000 |
| −0.3900 to −1.825 | −0.285 | −2 | 0001 |
| −0.6275 to −0.3900 | −0.513 | −3 | 0010 |
| −0.8750 to −0.6275 | −0.750 | −4 | 0011 |
| −1.1425 to −0.8750 | −1.010 | −5 | 0100 |
| −1.4625 to −1.1425 | −1.300 | −6 | 0101 |
| −1.900 to −1.4625 | −1.650 | −7 | 0110 |
| −4.000 to −1.900 | −2.320 | −8 | 0111 |

From the table it is seen that 1.75 volts is stored as binary 1110 in the first memory 60.

However, stored in the second digital memory 62 is an 8-bit binary value representing the median of the sixth range. This midpoint is 1.65 volts and 1.65 is stored in an 8-bit format. Therefore when a sample is retrieved from the first memory which lies in the seventh range, i.e. binary 1110, the midpoint of that range is retrieved and transmitted from the second memory 62.

Since the storage required for signalling symbol amplitudes in the second digital memory 62 is very modest, the medians of the n most likely amplitude ranges of the status and test symbols may also be predicted and stored there. Selection between the predicted values of the single frequency signals and multifrequency signals may be controlled by an additional control bit from the control means 35 which is applied through lead 80.

While a particular embodiment of the present invention has been shown and described, it will, of course, be understood that various modifications may be made without departing from the principles of the invention. The appended claims are, therefore, intended to cover any such modifications within the true spirit and scope of the invention.

What is claimed is:

1. An apparatus for transmitting a plurality of complex waveforms, the n equally likely amplitude ranges of which have been statistically predicted, said apparatus comprising:
    a first digital memory for storing a plurality of index vectors representing the amplitude of samples of all of said waveforms;
    a second digital memory responsive to said first memory for storing a single amplitude within each of said n ranges, each of said index vectors identifying one of said ranges;
    means for retrieving the index vectors representing the amplitudes of samples of a selected one of said waveforms from said first memory;
    means responsive to said retrieved index vectors for retrieving the single amplitudes stored in said second memory which lie within the ranges identified by the retrieved index vectors; and
    means for transmitting the amplitudes retrieved from said second memory.

2. The apparatus of claim 1 wherein said first digital memory stores said index values in an array which are x bits wide wherein x is related to n by the expression $2^x = n$.

3. The apparatus of claim 2 wherein $x=4$ and $n=16$.

4. The apparatus of claim 2 wherein said second digital memory stores said single amplitudes in an array which is greater than x bits wide.

5. The apparatus of claim 4 wherein said second digital memory stores said single amplitudes in an array which is 2 x bits wide.

6. The apparatus of claim 5 wherein x=4 and n=16.

7. The apparatus of claim 1 wherein said first digital memory comprises read only memory and wherein said means for retrieving said index values from said first digital memory comprises a clock means.

8. The apparatus of claim 1 wherein said second digital memory comprises a read only memory having a logic portion and a memory portion and wherein said means for retrieving said single amplitudes comprises said logic portion.

9. An apparatus for transmitting a plurality of complex waveforms the n equally likely amplitude ranges of which have been statistically predicted, said apparatus comprising:
- a first digital memory for storing a set of digital index vectors each of which identifies one of said ranges;
- a second digital memory for storing one amplitude from each of said ranges;
- a means for retrieving said index vectors from said first memory;
- a means responsive to said retrieving means for retrieving from said second memory the predicted amplitudes identified by said index vectors; and
- a means for transmitting said retrieved predicted amplitudes.

10. The apparatus of claim 9 wherein said index vectors are stored in said first digital memory in at least one array 4 bits wide.

11. The apparatus of claim 9 wherein said predicted amplitudes are stored in said second digital memory in an array 8 bits wide.

12. The apparatus of claim 11 wherein said means for retrieving said index vectors from said first memory comprises a clock means.

13. A method of transmitting a plurality of complex waveforms, the n equally likely amplitude ranges of which have been statistically predicted, said method comprising:
- storing a plurality of index vectors representing the amplitudes of samples of all of said waveforms, each of said index vectors identifying one of said ranges in a first digital memory;
- storing a single amplitude within each of said n ranges in a second digital memory, each of said index vectors identifying one of said ranges;
- retrieving the index vectors representing a selected one of said waveforms from said first memory;
- retrieving the single amplitude within the range identified by the retrieved index vector; and
- transmitting the amplitudes retrieved from said second memory.

14. The method of claim 13 wherein said statistical prediction comprises the steps of:
- taking samples of the amplitudes of the entire plurality of complex waveforms;
- rank ordering those observed amplitudes from lowest to highest;
- counting the number of times each particular amplitude is observed in those samples;
- grouping said samples into n batches each having equal probability of observance; and
- determining the lowest and highest amplitude observed in each batch, said lowest and highest amplitudes of each batch comprising one of said n ranges.

15. The method of claim 14 where n equals 16.

16. The method of claim 13 wherein said single amplitude in each of said ranges comprises the median of each of said ranges.

17. The method of claim 16 wherein the number of rank ordered amplitudes between said lowest amplitude and said median is substantially equal to the number of rank ordered amplitudes between said median and said highest amplitude for each range.

18. A method of transmitting a complex waveform comprising:
- converting said waveform to a digital electrical code the n characters of which represent the n statistically predicted equally likely amplitude ranges of said waveform where n is greater than or equal to three; and
- applying said digital electrical signal to a transmission facility.

* * * * *

UNITED STATES PATENT AND TRADEMARK OFFICE
CERTIFICATE OF CORRECTION

PATENT NO. : 4,218,587
DATED : August 19, 1980
INVENTOR(S) : J. Mark Elder; Peter G. Ruether It is certified that error appears in the above-identified patent and that said Letters Patent are hereby corrected as shown below:

In Column 1, lines 30-31, delete the word "system" and insert --symbol--

Column 4, line 36, delete "anlog" and insert, --analog--

Column 7, line 16, delete "6" and insert --16--

Signed and Sealed this

Ninth Day of December 1980

[SEAL]

Attest:

SIDNEY A. DIAMOND

Attesting Officer

Commissioner of Patents and Trademarks